US010762508B2

(12) United States Patent
Avegliano et al.

(10) Patent No.: US 10,762,508 B2
(45) Date of Patent: Sep. 1, 2020

(54) DETECTING FRAUDULENT MOBILE PAYMENTS

(71) Applicant: International Business Machines Corporation, Armonk, NY (US)

(72) Inventors: Priscilla Barreira Avegliano, São Paulo (BR); Silvia Cristina Sardela Bianchi, São Paulo (BR); Carlos Henrique Cardonha, São Paulo (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/363,630

(22) Filed: Mar. 25, 2019

(65) Prior Publication Data

US 2019/0220864 A1 Jul. 18, 2019

Related U.S. Application Data

(63) Continuation of application No. 14/218,336, filed on Mar. 18, 2014.

(51) Int. Cl.
*G06Q 40/00* (2012.01)
*G06Q 20/40* (2012.01)
*G06Q 20/32* (2012.01)

(52) U.S. Cl.
CPC ....... *G06Q 20/4016* (2013.01); *G06Q 20/322* (2013.01)

(58) Field of Classification Search
CPC .................................................. G06Q 20/4016
USPC ....... 705/14.26, 39, 44; 726/19, 28; 455/411
See application file for complete search history.

(56) References Cited

U.S. PATENT DOCUMENTS

| 8,145,561 | B1 | 3/2012 | Chu |
| 8,195,664 | B2 | 6/2012 | Lanxner et al. |
| 8,280,833 | B2 | 10/2012 | Miltonberger |
| 8,458,090 | B1 | 6/2013 | Batra et al. |
| 10,282,728 | B2 | 5/2019 | Avegliano |
| 2005/0278192 | A1 | 12/2005 | Cantini et al. |
| 2007/0133768 | A1 | 6/2007 | Singh |
| 2008/0086409 | A1 | 4/2008 | Moorman et al. |
| 2009/0018940 | A1 | 1/2009 | Wang et al. |
| 2010/0041391 | A1 | 2/2010 | Spivey et al. |

(Continued)

FOREIGN PATENT DOCUMENTS

EP 2287792 A1 2/2011

OTHER PUBLICATIONS http://www.neuralt.com/hres/Mobile%20Payments%20Fraud.pdf, consists of 2 pages, downloaded Jul. 2, 2013.

(Continued)

*Primary Examiner* — Samica L Norman
(74) *Attorney, Agent, or Firm* — Diana J. Rea; Isaac J. Gooshaw; William H. Hartwell

(57) ABSTRACT

A method for processing an attempted payment made using a mobile device includes receiving information about the attempted payment, receiving data indicative of a behavior of a user of the mobile device at the time of the attempted payment, computing a likelihood that the attempted payment is fraudulent, based on a comparison of the behavior of the user to an historical behavior pattern of the user, and sending an instruction indicating how to proceed with the attempted payment, based on the likelihood.

20 Claims, 6 Drawing Sheets

(56) References Cited

U.S. PATENT DOCUMENTS

| | | | |
|---|---|---|---|
| 2011/0016534 A1* | 1/2011 | Jakobsson | G06F 21/316 726/28 |
| 2011/0099628 A1 | 4/2011 | Lanxer et al. | |
| 2011/0125658 A1 | 5/2011 | Lanxer et al. | |
| 2011/0202453 A1* | 8/2011 | Issa | G06Q 10/00 705/39 |
| 2011/0205081 A1 | 8/2011 | Chen et al. | |
| 2011/0307381 A1 | 12/2011 | Kim et al. | |
| 2012/0179531 A1* | 7/2012 | Kim | G06Q 30/0225 705/14.26 |
| 2012/0197802 A1 | 8/2012 | Smith et al. | |
| 2012/0204257 A1* | 8/2012 | O'Connell | G06Q 30/06 726/19 |
| 2012/0259753 A1 | 10/2012 | Orad et al. | |
| 2012/0295580 A1 | 11/2012 | Corner | |
| 2013/0018795 A1 | 1/2013 | Kolhatkar et al. | |
| 2013/0024373 A1 | 1/2013 | Choudhuri et al. | |
| 2013/0036036 A1 | 2/2013 | Zoldi | |
| 2013/0036037 A1 | 2/2013 | Meredith et al. | |
| 2013/0046692 A1 | 2/2013 | Grigg et al. | |
| 2013/0102283 A1* | 4/2013 | Lau | H04W 12/06 455/411 |
| 2016/0321670 A1 | 11/2016 | Avegliano | |

OTHER PUBLICATIONS http://www.silvertailsystems.com/products/forensics, consists of 1 page, downloaded on Mar. 18, 2014.

http://www.xyverify.com/indoor-location.php#popup-div, consists of 1 page, downloaded on Mar. 18, 2014.

Abhishek Kumar Sinha, "Financial Transactions Get Personalized and Secure with Biometrics", Finsights Issue 10, consists of 13 pages.

Kou et al., "Survey of Fraud Detection Techniques" IEEE International Conference on Networking, Sensing & Control Mar. 21-23, 2004. pp. 749-754.

Mohammed et al., "Use of Biometrics to Tackle ATM Fraud", International Conference on Business and Economics Research 2010. pp. 331-335.

Lu et al., "An Agent-Oriented Mobile Payment System Secured Using a Biometrics Approach"; International Journal of Agent Oriented Software Engineering, vol. 3, No. 2-3, pp. 163-187; 2009; Publisher: Inderscience Enterprises Ltd.; Country of Publication Switzerland; ISSN 1746-1375; Database: INSPEC.

Goyal et al.,"Bio-metric Trust and Security in Mobile Banking" International Journal of Advanced Research in Computer Science and Electronics Engineering vol. 1, issue Jul. 5, 2012, pp. 81-87.

Hulsebosch et al., "Feasibility of Context-enhanced Authorization in the banking sector" Jan. 30, 2012 version 2.0.0 consists of 25 pages.

Figueredo De Santana et al., "Summarizing Observational Client-side Data to Reveal Web Usage Patterns", SAC'10, Mar. 22-26, 2010, Sierre, Switzerland, Copyright 2010 ACM, 5 pages.

Phua et al., "A Comprehensive Survey of Data Mining-based Fraud Detection Research", Published in ArXiv 2007, 14 pages, <https://www.semanticscholar.org/paper/A-Comprehensive-Survey-of-Data-Mining-based-Fraud-Phua-Lee/739880b806dd9ee8605c2139057b4e75fd7bc4c7>.

* cited by examiner

DETECTING FRAUDULENT MOBILE PAYMENTS

FIELD OF THE DISCLOSURE

The present disclosure relates generally to predictive analytics and relates more specifically to detecting fraudulent mobile payments.

BACKGROUND OF THE DISCLOSURE

As mobile technology has advanced, the ability to make monetary payments from one's mobile device has become an increasingly useful feature. Typically, a specialized application is downloaded to the mobile device, and the application stores information about the user's debit and/or credit cards. Depending on the device and on the payment model, transactions may be completed using mobile communication protocols such as short messaging service (SMS) or unstructured supplementary service data (USSD). More recent payment models have also implemented near field communication (NFC) technology, in which the mobile device is placed in proximity to an NFC terminal to complete the transaction.

As the use of this technology grows, so too does the risk of fraudulent attacks on the mobile devices. Thus, effective fraud detection is critical. Conventional fraud detection mechanisms are based on historical transaction data. For instance, a transaction that deviates significantly from a user's typical usage patterns may generate a fraud alert. However, in many cases, this approach can result in a false positive; that is, a legitimate transaction by the authorized user may be prevented if it is different enough from the user's transaction history, leading to user dissatisfaction. On the other hand, fraudulent usage that is similar enough to the historical patterns may go undetected.

SUMMARY OF THE DISCLOSURE

A method for processing an attempted payment made using a mobile device includes receiving information about the attempted payment, receiving data indicative of a behavior of a user of the mobile device at the time of the attempted payment, computing a likelihood that the attempted payment is fraudulent, based on a comparison of the behavior of the user to an historical behavior pattern of the user, and sending an instruction indicating how to proceed with the attempted payment, based on the likelihood.

Another method for processing an attempted payment made using a mobile device includes developing a model that represents a behavior pattern of a user of the mobile device, using a sensor integrated in the mobile device, providing the model to a server, sending information about the attempted payment to the server, and receiving an instruction from the server that instructs the mobile device on how to proceed with the attempted payment.

Another method for processing an attempted payment made using a mobile device includes receiving information about the attempted payment, generating a first score indicative of how closely the attempted transaction matches an observed transaction pattern associated with a user of the mobile device, generating a second score indicative of how closely the attempted transaction matches an observed behavioral pattern of the user, generating a third score indicative of how risky the attempted transaction is in light of the observed transaction pattern and an observed behavioral pattern of the user, aggregating the first score, the second score, and the third score in order to generate a final score indicative of a likelihood that the attempted payment is fraudulent, and sending an instruction to the mobile device indicating how to proceed with the attempted payment, based on the likelihood.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one embodiment, the present invention is a method and apparatus for detecting fraudulent mobile payments. Embodiments of the invention automatically detect when an individual's financial data is being used in a fraudulent manner (e.g., by an unauthorized party or in an unauthorized way) by analyzing a combination of user transaction history, risk score, and information collected from mobile sensors. The user transaction history is based on a user's historical patterns of usage as they related to the user's forms of payment (e.g., credit and/or debit cards). The risk score reflects the various risk elements of a particular transaction (e.g., location of transaction, presence or absence of mobile security applications, etc.). The information collected from the mobile sensors relates to both transaction history and to the conditions of a particular transaction. For instance, slip, touch, and/or tactile sensors may be used to detect a user's interaction patterns with the mobile device and the applications running on the device; physiological patterns may be used to detect the user's physiological patterns relating to device usage; temperature, noise, and/or light sensors may be used to detect environmental patterns relating to device usage; incoming and outgoing call data and text and multimedia messaging data may be used to detect a user's communication patterns; and accelerometers, gyroscopes, and/or altimeters may be used to detect a user's mobility patterns.

Embodiments of the present invention therefore rely on a user's behavior information, and not just his or her transaction history, to provide a more accurate model of "normal" or legitimate usage. This allows the model to be more closely tailored to the individual rather than to a group of representative individuals. This improves the user's experience by minimizing false positives and detecting fraudulent usage more quickly.

Figure 1:
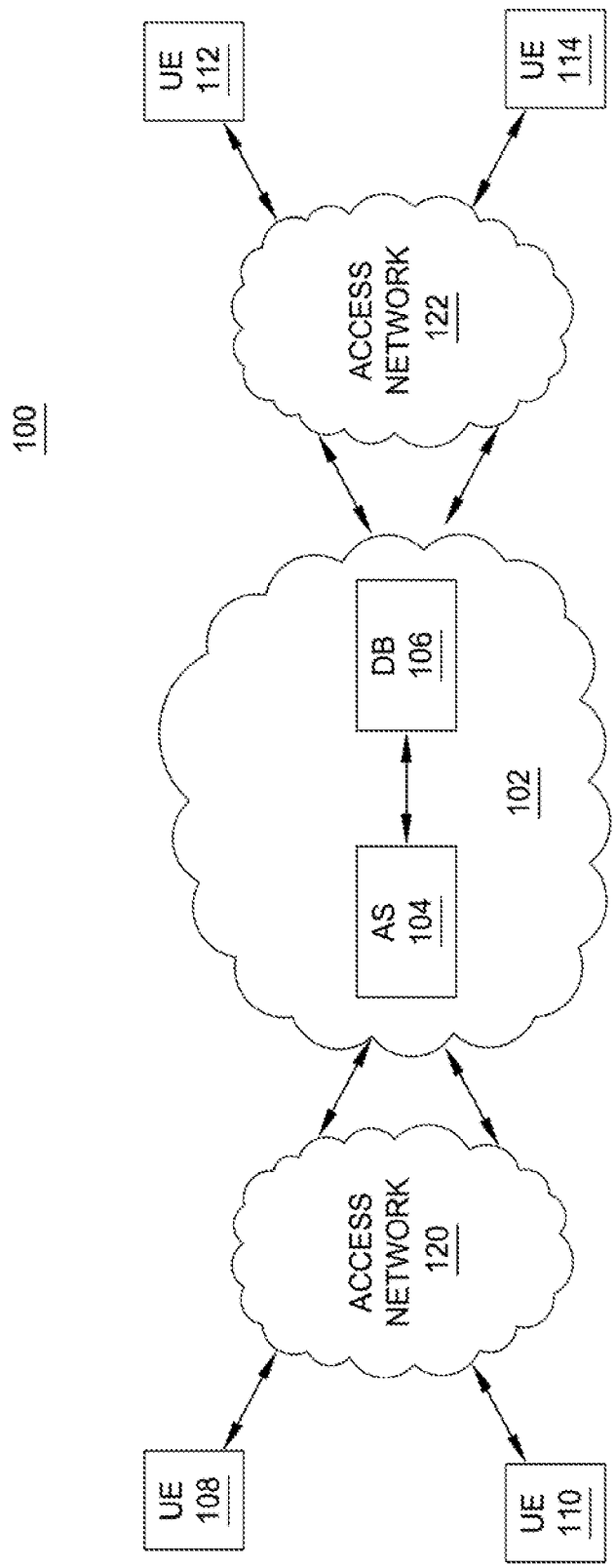
FIG. 1 is a block diagram depicting one example of a communications network.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 4:
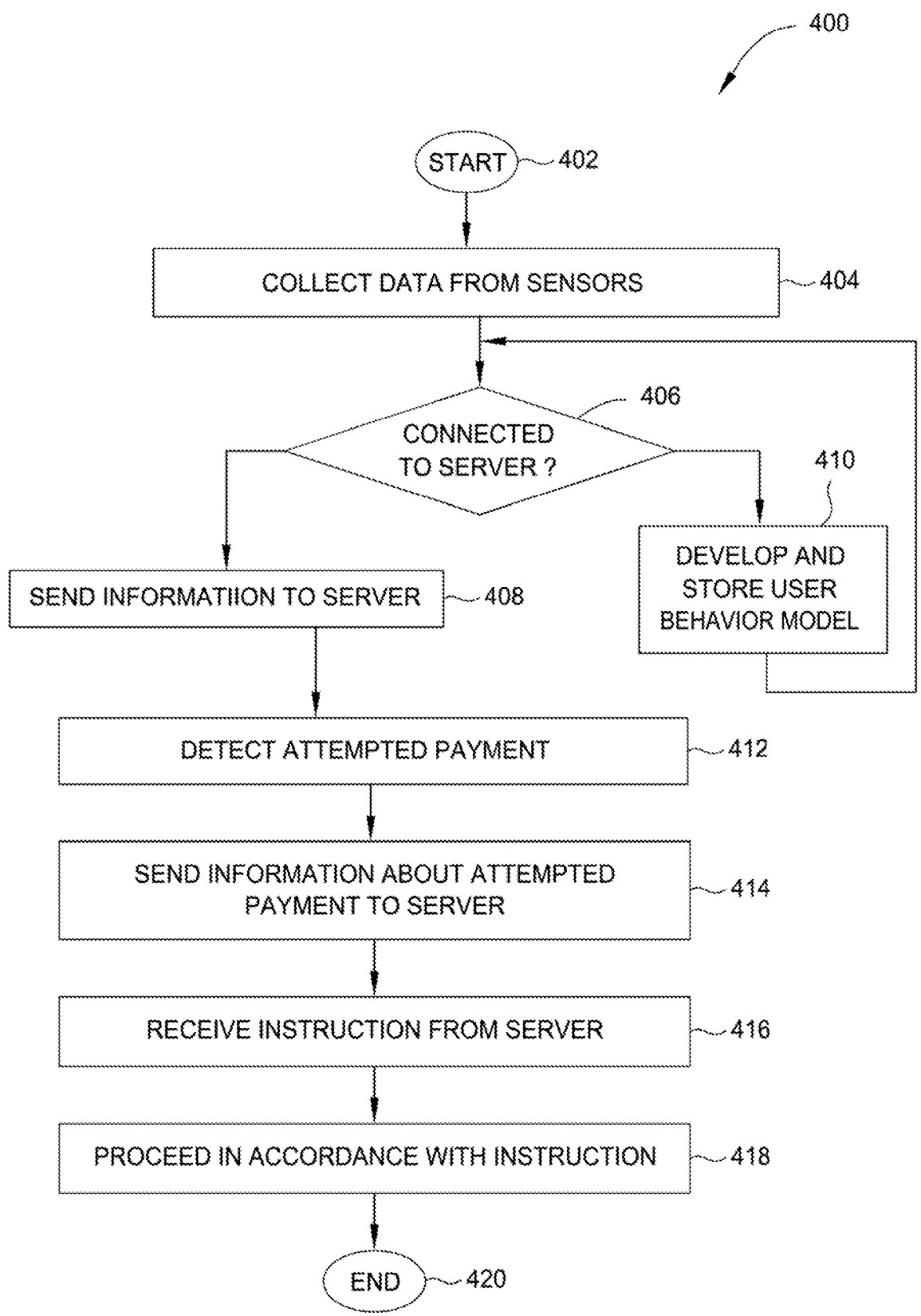
FIG. 4 is a flow diagram illustrating one embodiment of a method for detecting fraudulent mobile payments, according to the present invention.
Figure 6:
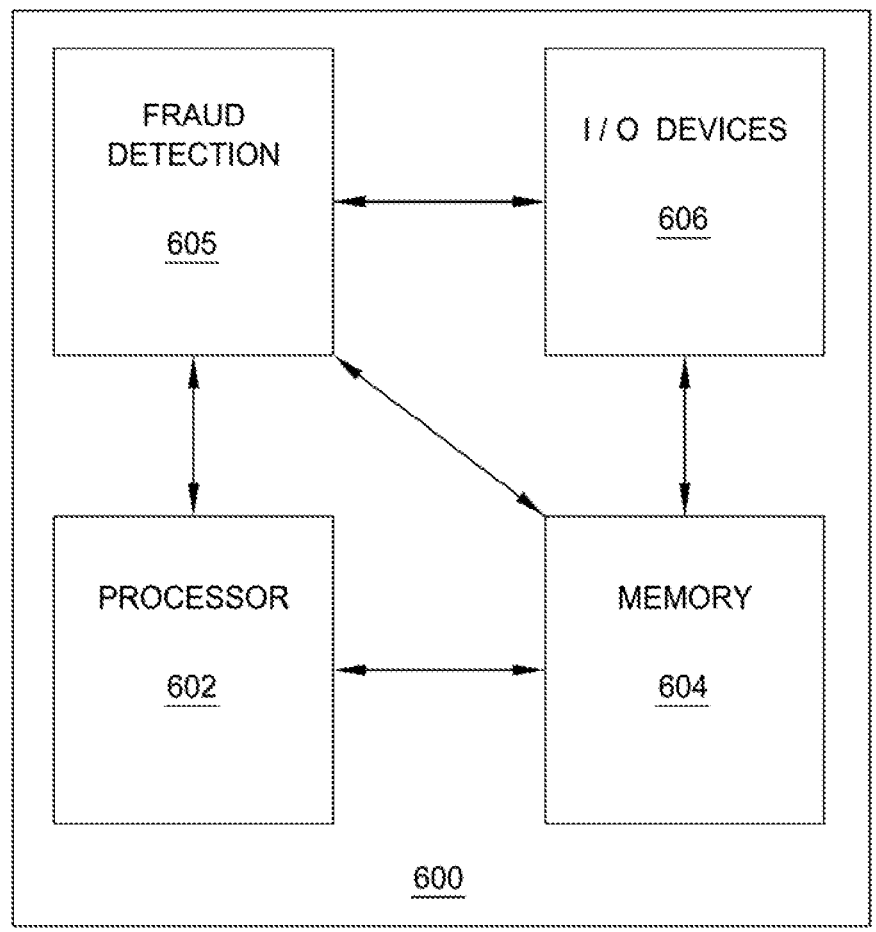
FIG. 6 is a high level block diagram of the present invention implemented using a general purpose computing device.

In one embodiment, the AS 104 may comprise a special purpose computer as illustrated in FIG. 4 and discussed below. Alternatively, the AS 104 may comprise a general purpose computer as illustrated in FIG. 6 and discussed below. In one embodiment, the AS 104 may perform the methods and algorithms discussed below related to detecting fraud in mobile payments.

In one embodiment, the DB 106 may store behavioral data, sensor values, and transaction history information for users of the network 100. For example, the DB 106 may store data from global positioning system (GPS) sensors, accelerometers, gyroscopes, environmental sensors, physiological sensors, and the like provided by a mobile device for each user. This data may comprise raw sensor values or information that has been summarized by the mobile device. The DB 106 may also store a users' call or messaging history and history of past transactions (including, for example, information about amounts of money spent, locations of transactions, types of goods or services purchased, etc.).

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of mobile device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

Figure 2:
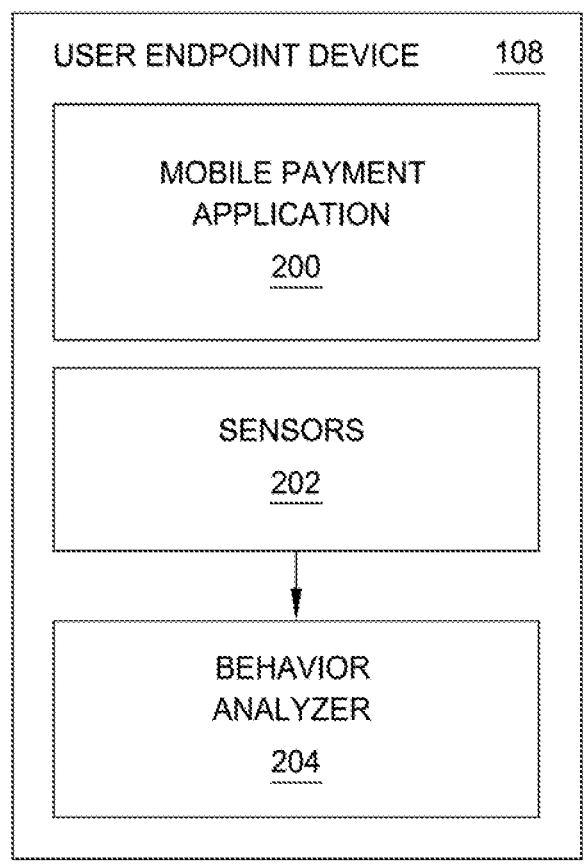
FIG. 2 is a block diagram illustrating one embodiment of a user endpoint device, according to the present invention.

FIG. 2 is a block diagram illustrating one embodiment of the exemplary user endpoint device 108, according to the present invention. Any of the other user endpoint devices 110, 112, and 114 illustrated in FIG. 1 may be configured in a similar manner.

As discussed above, the user endpoint device 108 is any mobile device (e.g., a smart phone, a tablet computer, etc.) that can run applications. For ease of explanation, a discussion of the conventional components of such a device, which are well known in the art, is omitted.

In addition to the conventional components, the user endpoint device 108 also includes a mobile payment application 200, one or more sensors 202, and a behavior analyzer 204. The mobile payment application 200 is an executable application that stores information about the user's forms of monetary payment (e.g., debit and/or credit cards, bank accounts, etc.) and communicates with a server (e.g., AS 104 of FIG. 1) to process payments for goods and/or services purchased by the user.

The sensors 204 measure data indicative of user behavior and location. This data may include, for example, information about the user's interactions with the user endpoint device 108 while using applications executing on the device, the user's interactions with the applications themselves, the user's mobility patterns, the user's communication patterns, the user's environment, the user's physiological patterns, or the like. For instance, information about the user's interactions with the mobile endpoint device 108 can be detected by slip, touch, and/or tactile sensors (e.g., capturing pressure applied to the device display, or how the user swipes, drags, rotates, flicks, pinches, spreads, or taps the display while interacting with certain applications). Information about the user's interactions with the applications can be detected by the applications themselves or by cameras or media players integrated with the user endpoint device 108. Information about the user's mobility patterns can be detected by GPS sensors, accelerometers, gyroscopes, wireless technology standard hardware, or altimeters (e.g., capturing the location, position, and/or orientation of the user endpoint device 108). Information about the user's communication patterns can be detected by incoming and outgoing call logs and messaging history. Information about the user's environment can be detected by noise, temperature, and light sensors (e.g., capturing the types of environments in which the user tends to use the user endpoint device 108 and/or the types of environments that are known to be less secure). Information about the user's physiological patterns can be detected by heart rate monitors, respiration monitors, and body temperature sensors (e.g., capturing when the user is stressed or under the influence of alcohol or other substances).

The behavior analyzer 206 receives data from the sensors 204 and develops a model of the user's behavior patterns based on this data. In particular, the model reflects the user's behaviors while interacting with the user endpoint device 108. This model may be stored locally on the user endpoint device 108 and synchronized (either periodically or before each attempted transaction) with similar data accessed by the server 104 (e.g., stored in database 106).

Figure 3:
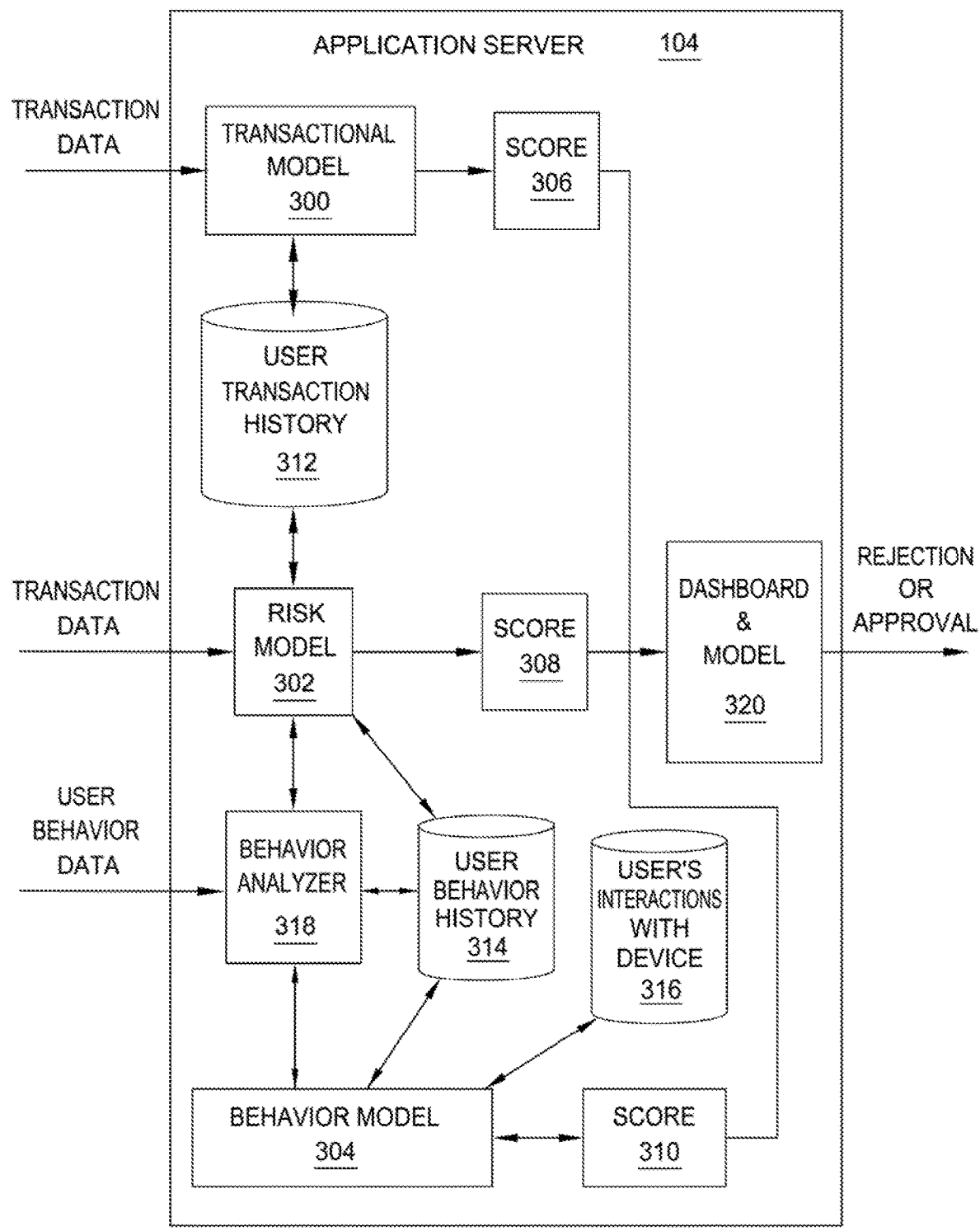
FIG. 3 is a block diagram illustrating one embodiment of the exemplary application server, according to the present invention.

FIG. 3 is a block diagram illustrating one embodiment of the exemplary application server 104, according to the present invention. As illustrated, the server 104 generally comprises a transaction model 300, a risk information model 302, a behavior history model 304, and a dashboard 306, among other components. Any of these components may be implemented as a processor.

The transactional model 300 receives information about transactions performed by the user using the user endpoint device 108 and uses this information to build a model of the user's transaction patterns. The received information may include, for example, for each transaction: the amount of money spent, the type of merchant, the category of the purchase, the amount of time elapsed since the last purchase of the same type or category, and/or if the transaction occurred in a foreign country. Information relating to past transactions is retrieved from a user transaction history database 312 (or alternatively from the DB 106 of FIG. 1); information about a new, attempted transaction is received directly from the user endpoint device 108. The transaction model is refined periodically; the frequency of the refinement is adjustable (e.g., by a system administrator). As discussed in greater detail below, when data about a new, attempted transaction is received, the transaction model is used to generate a first score 306 for the new transaction. The first score 306 reflects how closely the new transaction matches the user's observed transaction patterns. For instance, if the user's transactions tend to all occur within one country, and the new transaction is being attempted in a different country, the first score 306 may reflect a deviation from the user's normal transaction patterns.

The risk information model 302 receives information about transactions performed by the user using the user endpoint device 108 and about the user's behavior while using the user endpoint device 108. The risk information model 302 uses this information to build a model of the user's risk patterns. The received information may include, for example: information about the merchant involved in a transaction (e.g., location, number of previous associated fraudulent transactions, reputation) or security-related behavioral information (e.g., location, security mechanisms active in the user endpoint device 108, the provider or permissions associated with malware detection applications installed on the user endpoint device 108, and/or the manner in which passwords are stored on the user endpoint device 108). This information may be retrieved from the user transaction history database 312 and/or from a user behavior history database 314 (or alternatively from the DB 106 of FIG. 1). As discussed in greater detail below, when data about a new, attempted transaction is received, the risk information model 302 is used to generate a second score 308 for the new transaction. The second score 308 reflects how risky the new transaction appears to be in light of the user's observed transaction and behavioral patterns. For instance, if the new transaction is being attempted in an unsecure location or without the use of any security mechanisms (e.g., a password), then the second score 308 may reflect a high level of risk associated with the new transaction.

The behavior history model 304 receives information about the user's behavior while using the user endpoint device 108. The behavior history model 304 uses this information to build a model of the user's behavior patterns. The received information may include, for example: the manner in which the user interacts with the user endpoint device 108 while performing a transaction involving a mobile payment. This information may be retrieved, for example from the user behavior history database 314 (which may, in turn, receive the information from a behavior analyzer 318) and/or a device interaction database 316 (or alternatively from the DB 106 of FIG. 1). As discussed in greater detail below, when data about a new, attempted transaction is received, the behavior history model 304 is used to generate a third score 310 for the new transaction. The third score 310 reflects how closely the new transaction matches the user's observed behavioral patterns. For instance, if the user's interactions with the user endpoint device 108 during such transactions tend to be slow and smooth (e.g., as detected by pressure and/or slip sensors), and the interactions associated with the new transaction are hasty or erratic, the third score 310 may reflect a deviation from the user's normal behavioral patterns.

The dashboard 306 receives the first score 306, the second score 308, and the third score 310 and aggregates them to calculate a final score. In one embodiment, aggregation involves summing the individual scores. In a further embodiment, different weights are applied to each of the first score 306, the second score 308, and the third score 310, depending on the importance and accuracy of the respective models used to generate the scores. The weights may be adjusted and/or improved over time, for instance based on feedback received from the user. Based on the final score, the dashboard 306 transmits either a rejection or an approval of the new transaction. For instance, if the final score is higher than a predefined threshold (i.e., reflecting a high probability that the new transaction is fraudulent), the dashboard may reject the new transaction. In the case of a rejection, additional authentication (e.g., a token, a machine-readable code, or a biometric identifier) may be requested to complete the new transaction. After authentication, a feedback mechanism may be transmitted to the user, whereby the user may confirm or reject the behavioral or transaction information that resulted in the high final score. Such feedback may be stored in the appropriate database and used to refine the appropriate models.

FIG. 4 is a flow diagram illustrating one embodiment of a method 400 for detecting fraudulent mobile payments, according to the present invention. The method 400 may be implemented, for example, by the user endpoint device 108 illustrated in FIGS. 1 and 2. As such, reference is made in the discussion of the method 400 to various components of the user endpoint device 108 illustrated in FIG. 2. Such reference is made for illustrative purposes only and does not limit the method 400 to implementation by the user endpoint device 108.

The method 400 begins in step 402. In step 404, the behavior analyzer 204 collects data from the sensors 202. In step 404, the user endpoint device 108 determines whether it is connected to the server 104.

If the user endpoint device 108 concludes in step 404 that it is connected to the server 104, the method proceeds to step 408, and the user endpoint device 108 sends information relating to the collected data to the server 104. In one embodiment, the user endpoint device 108 sends the raw sensor data; in another embodiment, the user endpoint device 108 sends a summary of the sensor data.

Alternatively, if the user endpoint device 108 concludes in step 404 that it is not connected to the server 104, the method proceeds to step 410, and the user endpoint device 108 develops and stores a model of the user's behavior based on the collected data. The method 400 then returns to step 404. Once a connection to the server 104 is established, the model of the user's behavior is sent to the server 104.

In step 412, the mobile payment application 200 detects that the user is attempting to make a payment. In step 414, the mobile payment application 200 sends information about the attempted payment to the server 104.

In step 416, the mobile payment application 200 receives an instruction from the server 104. In one embodiment, the instruction instructs the mobile payment application 200 to either approve or reject the attempted payment. If the instruction is to reject the attempted payment, the instruction may request further information for authentication purposes and/or user feedback.

In step 418, the mobile payment application 200 proceeds in accordance with the instruction (e.g., by approving or denying the attempted payment or by sending additional requested information to the server 104).

The method 400 ends in step 420.

Figure 5:
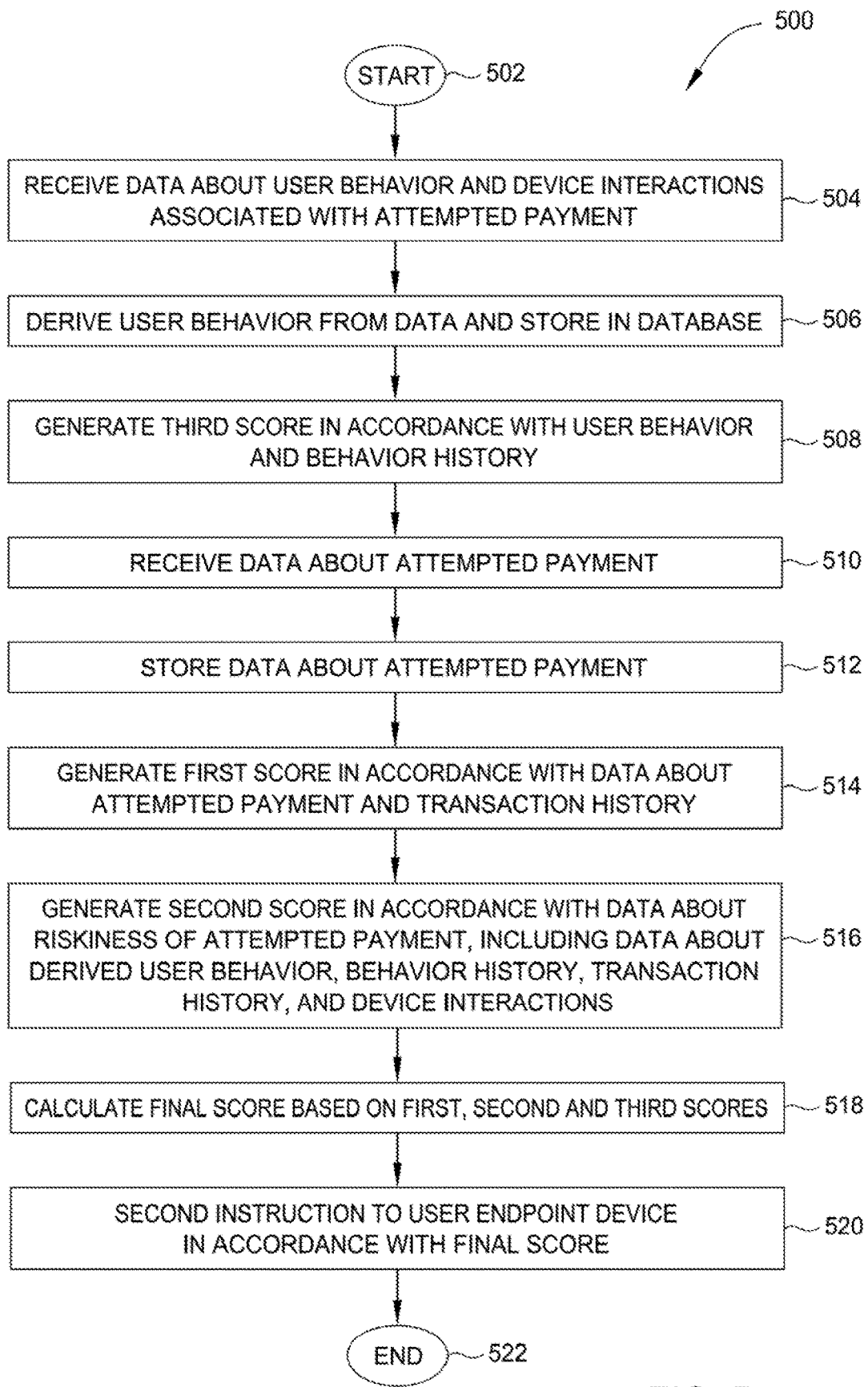
FIG. 5 is a flow diagram illustrating one embodiment of a method 500 for detecting fraudulent mobile payments, according to the present invention.

FIG. 5 is a flow diagram illustrating one embodiment of a method 500 for detecting fraudulent mobile payments, according to the present invention. The method 500 may be implemented, for example, by the application server 104 illustrated in FIGS. 1 and 3. As such, reference is made in the discussion of the method 500 to various components of the application server 104 illustrated in FIG. 3. Such reference is made for illustrative purposes only and does not limit the method 500 to implementation by the application server 104.

The method 500 begins in step 502. In step 504, the behavior analyzer 318 receives, from the user endpoint device 108, data about the user's behavior and device interactions that are associated with an attempted payment. For instance, as discussed above, the received data may include raw or summarized sensor data collected by sensors integrated in the user endpoint device 108.

In step 506, the behavior analyzer 318 derives a user behavior from the received data and stores the user behavior in the user behavior history database 314 (or alternative in the DB 106).

In step 508, the behavior model 304 uses the user behavior derived from the behavior analyzer and the behavioral patterns stored in the user behavior history database 314 to generate the third score.

In step 510, transactional model 300 and the risk model 302 receive, from the user endpoint device 108, data about the attempted payment. In step 512, the transactional model 300 stores the attempted payment in the user transaction history database 312 (or alternatively in the DB 106).

In step 514, the transactional model 300 uses the data received in step 510 and the user's transaction patterns stored in the user transaction history database 312 to generate the first score.

In step 516, the risk model 302 uses the data received in step 510, the user behavior derived in step 506, and information stored in the user transaction history database 312, the user behavior history database 314, and the device interactions database 316 (or alternatively from the DB 106) to generate the second score.

In step 518, the dashboard 306 calculates a final score based on the first score, the second score, and the third score. As discussed above, this calculation may involve applying different weights to the respective scores and summing over the weighted scores.

In step 520, the dashboard 306 sends an instruction to the user endpoint device 108 in accordance with the final score. As discussed above, if the final score indicates a high likelihood of fraud (based on some predefined threshold), the instruction may instruct the user endpoint device 108 to reject the attempted payment and/or to provide further information for authentication or user feedback. If the final score indicates a low likelihood of fraud, the instruction may instruct the user endpoint device to approve the attempted payment.

The method 500 ends in step 522.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step. Furthermore, any flow diagrams referenced herein are not meant to impose a required order on the illustrated steps. That is, unless stated otherwise, the illustrated steps may be performed in an order other than that in which they are illustrated.

FIG. 6 is a high level block diagram of the present invention implemented using a general purpose computing device 600. In one embodiment, the general purpose computing device 600 is deployed as a user endpoint device, such as the user endpoint device 108, 110, 112, or 114 illustrated in FIG. 1. In another embodiment, the general purpose computing device 600 is deployed as a server, such as the application server 104 illustrated in FIG. 1. It should be understood that embodiments of the invention can be implemented as a physical device or subsystem that is coupled to a processor through a communication channel. Therefore, in one embodiment, a general purpose computing device 600 comprises a processor 602, a memory 604, a fraud detection module 605, and various input/output (I/O) devices 606 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive). In another embodiment, at least one I/O device is a sensor (e.g., a slip sensor, a touch sensor, a tactile sensor, a temperature sensor, a noise sensor, a light sensor, an accelerometer, a gyroscope, an altimeter, or the like).

Alternatively, embodiments of the present invention (e.g., fraud detection module 605) can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the fraud detection module 605 for detecting fraudulent mobile payments described herein with reference to the preceding Figures can be stored on a tangible or non-transitory computer readable medium (e.g., RAM, magnetic or optical drive or diskette, and the like).

Although various embodiments which incorporate the teachings of the present invention have been shown and described in detail herein, those skilled in the art can readily devise many other varied embodiments that still incorporate these teachings.

What is claimed is:

1. A method, comprising:
   receiving, by a server, information from a mobile payment application executing on a mobile device, wherein the information relates to a payment that the mobile payment application is attempting to make to a third party;

generating, by the server and using at least a first portion of the information, a first score indicative of how closely the payment matches an observed transaction pattern associated with a user of the mobile device;

generating, by the server and using at least a second portion of the information, a second score indicative of how closely a behavior of the user during the payment matches a first model, wherein the first model is synchronized, prior to the receiving, with a second model that is generated by the mobile device based on an observed behavioral pattern of the user;

generating, by the server and using at least a third portion of the information, a third score indicative of how risky the payment is;

aggregating, by the server, the first score, the second score, and the third score in order to generate a final score indicating a likelihood that the payment is fraudulent, wherein the aggregating comprises assigning different weights to each score of the first score, the second score, and the third score, and wherein the different weights change over time based on user feedback;

determining, by the server, whether the payment should proceed, based on the likelihood; and sending, by the server, an instruction to the mobile payment application based on the determining, wherein the instruction instructs the mobile payment application to take an action with respect to the payment.

2. The method of claim 1, at least some of the information is obtained using a sensor integrated in the mobile device.

3. The method of claim 1, wherein the observed behavioral pattern of the user describes a pattern of interaction between the user and the mobile device while the user uses an application executing on the mobile device.

4. The method of claim 3, wherein the pattern of interaction includes physical contact between the user and a touch screen of the mobile device.

5. The method of claim 4, wherein the physical contact comprises at least one of: a swipe, a drag, a rotation, a flick, a pinch, a spread, or a tap.

6. The method of claim 1, wherein the first model describes a mobility pattern of the user.

7. The method of claim 1, wherein the first model describes a communication pattern of the user.

8. The method of claim 1, wherein the first model describes a physiological pattern of the user.

9. The method of claim 1, wherein the first model describes an environment in which the user tends to use the mobile device.

10. The method of claim 1, further comprising:
periodically refining, by the server, the observed transaction pattern based on additional information provided by the mobile payment application, wherein the additional information related to additional payments that the mobile payment application attempts to make.

11. The method of claim 1, wherein the third portion of the information comprises a usage by the user of a security mechanism during the payment.

12. The method of claim 1, wherein the third portion of the information comprises a location from which the payment was initiated.

13. The method of claim 1, further comprising:
receiving, by the server, user feedback from the mobile payment application, wherein the user feedback confirms or rejects at least some of the information; and
refining, by the server, the observed transaction pattern, wherein the refining is based on the user feedback.

14. The method of claim 13, wherein the different weights change further over time based on the user feedback.

15. The method of claim 1, further comprising:
prior to sending the instruction to the mobile payment application, sending, by the server, a request for authentication information to the mobile payment application.

16. The method of claim 1, wherein the server and the mobile payment application communicate over an Internet Protocol network.

17. The method of claim 1, where the mobile payment application communicates with a server to complete transactions for goods and services.

18. The method of claim 1, wherein the first model is stored in a database that is accessible by the server.

19. The method of claim 18, wherein the second model is stored on the mobile device.

20. A non-transitory computer readable storage device containing an executable program, where execution of the program causes a processor of a server in a communications network to perform steps comprising:
receiving, by a server, information from a mobile payment application executing on a mobile device, wherein the information relates to a payment that the mobile payment application is attempting to make to a third party;

generating, by the server and using at least a first portion of the information, a first score indicative of how closely the payment matches an observed transaction pattern associated with a user of the mobile device;

generating, by the server and using at least a second portion of the information, a second score indicative of how closely a behavior of the user during the payment matches a first model, wherein the first model is synchronized, prior to the receiving, with a second model that is generated by the mobile device based on an observed behavioral pattern of the user;

generating, by the server and using at least a third portion of the information, a third score indicative of how risky the payment is;

aggregating, by the server, the first score, the second score, and the third score in order to generate a final score indicating a likelihood that the payment is fraudulent, wherein the aggregating comprises assigning different weights to each score of the first score, the second score, and the third score, and wherein the different weights change over time based on user feedback;

determining, by the server, whether the payment should proceed, based on the likelihood; and sending, by the server, an instruction to the mobile payment application based on the determining, wherein the instruction instructs the mobile payment application to take an action with respect to the payment.

* * * * *